US007786987B2

(12) United States Patent
Nielsen

(10) Patent No.: US 7,786,987 B2
(45) Date of Patent: Aug. 31, 2010

(54) METHODS AND APPARATUS TO DETECT AN OPERATING STATE OF A DISPLAY BASED ON VISIBLE LIGHT

(75) Inventor: Christen V. Nielsen, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 11/388,555

(22) Filed: Mar. 24, 2006

(65) Prior Publication Data

US 2006/0232575 A1 Oct. 19, 2006

Related U.S. Application Data

(63) Continuation of application No. PCT/US03/30370, filed on Sep. 25, 2003.

(51) Int. Cl.
*G06F 3/038* (2006.01)

(52) U.S. Cl. ........................ 345/207; 345/166; 348/565

(58) Field of Classification Search ................... 345/87, 345/166, 207; 725/13–16; 348/511, 565
See application file for complete search history.

(56) References Cited

U.S. PATENT DOCUMENTS

| | | | |
|---|---|---|---|
| 3,281,695 | A | 10/1966 | Bass |
| 3,315,160 | A | 4/1967 | Goodman |
| 3,483,327 | A | 12/1969 | Schwartz |
| 3,651,471 | A | 3/1972 | Haselwood et al. |
| 3,733,430 | A | 5/1973 | Thompson et al. |
| 3,803,349 | A | 4/1974 | Watanabe |
| 3,906,454 | A | 9/1975 | Martin |
| 3,947,624 | A | 3/1976 | Miyake |
| 4,027,332 | A | 5/1977 | Wu et al. |
| 4,044,376 | A | 8/1977 | Porter |
| 4,058,829 | A | 11/1977 | Thompson |
| 4,245,245 | A | 1/1981 | Matsumoto et al. |
| 4,388,644 | A | 6/1983 | Ishman et al. |

(Continued)

FOREIGN PATENT DOCUMENTS

| | | |
|---|---|---|
| DE | 3401762 | 8/1985 |

(Continued)

OTHER PUBLICATIONS

International Search Report corresponding to International Application Serial No. PCT/US2003/030355, May 5, 2004, 6 sheets.

(Continued)

*Primary Examiner*—Kimnhung Nguyen
(74) *Attorney, Agent, or Firm*—Hanley, Flight & Zimmerman, LLC

(57) ABSTRACT

Methods and apparatus to detect operating states of a display based on visible light are disclosed. An example device to detect an operating state of a display includes at least one optical sensor and a logic circuit. The at least one optical sensor is disposed to detect visible light emanating from a screen of the display and to convert the visible light into an electrical signal. The logic circuit is coupled to the at least one optical sensor to generate an output signal indicative of the operating state of the display based on the electrical signal.

9 Claims, 5 Drawing Sheets

200

U.S. PATENT DOCUMENTS

| | | | | |
|---|---|---|---|---|
| 4,546,382 | A | 10/1985 | McKenna et al. | |
| 4,566,030 | A | 1/1986 | Nickerson et al. | |
| 4,574,304 | A | 3/1986 | Watanabe et al. | |
| 4,613,904 | A | 9/1986 | Lurie | |
| 4,622,583 | A | 11/1986 | Watanabe et al. | |
| 4,642,685 | A | 2/1987 | Roberts et al. | |
| 4,644,393 | A | 2/1987 | Smith et al. | |
| 4,647,964 | A | 3/1987 | Weinblatt | |
| 4,697,209 | A | 9/1987 | Kiewit et al. | |
| 4,723,302 | A | 2/1988 | Fulmer et al. | |
| 4,764,808 | A | 8/1988 | Solar | |
| 4,769,697 | A | 9/1988 | Gilley et al. | |
| 4,779,198 | A | 10/1988 | Lurie | |
| 4,800,437 | A | 1/1989 | Hosoya | |
| 4,807,031 | A | 2/1989 | Broughton et al. | |
| 4,876,736 | A | 10/1989 | Kiewit | |
| 4,885,632 | A | 12/1989 | Mabey et al. | |
| 4,907,079 | A | 3/1990 | Turner et al. | |
| 4,912,552 | A | 3/1990 | Allison, III et al. | |
| 4,931,865 | A | 6/1990 | Scarampi | |
| 4,943,963 | A | 7/1990 | Waechter et al. | |
| 4,965,825 | A | 10/1990 | Harvey et al. | |
| 4,972,503 | A | 11/1990 | Zurlinden | |
| 5,097,328 | A | 3/1992 | Boyette | |
| 5,136,644 | A | 8/1992 | Audebert et al. | |
| 5,165,069 | A | 11/1992 | Vitt et al. | |
| 5,226,177 | A | 7/1993 | Nickerson | |
| 5,235,414 | A | 8/1993 | Cohen | |
| 5,251,324 | A | 10/1993 | McMullan, Jr. | |
| 5,310,222 | A | 5/1994 | Chatwin et al. | |
| 5,319,453 | A | 6/1994 | Copriviza et al. | |
| 5,335,277 | A | 8/1994 | Harvey et al. | |
| 5,355,161 | A | 10/1994 | Bird et al. | |
| 5,398,055 | A | 3/1995 | Nonomura et al. | |
| 5,404,161 | A | 4/1995 | Douglass et al. | |
| 5,404,172 | A | 4/1995 | Berman et al. | |
| 5,408,258 | A | 4/1995 | Kolessar | |
| 5,425,100 | A | 6/1995 | Thomas et al. | |
| 5,481,294 | A | 1/1996 | Thomas et al. | |
| 5,483,276 | A | 1/1996 | Brooks et al. | |
| 5,488,408 | A | 1/1996 | Maduzia et al. | |
| 5,505,901 | A | 4/1996 | Harney et al. | |
| 5,512,933 | A | 4/1996 | Wheatley et al. | |
| 5,550,928 | A | 8/1996 | Lu et al. | |
| 5,659,367 | A | 8/1997 | Yuen | |
| 5,760,760 | A | 6/1998 | Helms | |
| 5,767,922 | A | 6/1998 | Zabih et al. | |
| 5,771,307 | A | 6/1998 | Lu et al. | |
| 5,801,747 | A | 9/1998 | Bedard | |
| 5,874,724 | A | 2/1999 | Cato | |
| 5,889,548 | A | 3/1999 | Chan | |
| 5,896,554 | A | 4/1999 | Itoh | |
| 5,963,844 | A | 10/1999 | Dail | |
| 6,035,177 | A | 3/2000 | Moses et al. | |
| 6,049,286 | A | 4/2000 | Forr | |
| 6,124,877 | A | 9/2000 | Schmidt | |
| 6,137,539 | A | 10/2000 | Lownes et al. | |
| 6,177,931 | B1 | 1/2001 | Alexander et al. | |
| 6,184,918 | B1 | 2/2001 | Goldschmidt Iki et al. | |
| 6,286,140 | B1 | 9/2001 | Ivanyi | |
| 6,297,859 | B1 | 10/2001 | George | |
| 6,311,214 | B1 | 10/2001 | Rhoads | |
| 6,388,662 | B2 | 5/2002 | Narvi et al. | |
| 6,400,996 | B1 | 6/2002 | Hoffberg et al. | |
| 6,457,010 | B1 | 9/2002 | Eldering et al. | |
| 6,463,413 | B1 | 10/2002 | Applebaum et al. | |
| 6,467,089 | B1 | 10/2002 | Aust et al. | |
| 6,477,508 | B1 | 11/2002 | Lazar et al. | |
| 6,487,719 | B1 | 11/2002 | Itoh et al. | |
| 6,519,769 | B1 | 2/2003 | Hopple et al. | |
| 6,523,175 | B1 | 2/2003 | Chan | |
| 6,529,212 | B2 | 3/2003 | Miller et al. | |
| 6,542,878 | B1 | 4/2003 | Heckerman et al. | |
| 6,567,978 | B1 | 5/2003 | Jarrell | |
| 6,570,559 | B1 | 5/2003 | Oshima | |
| 6,647,212 | B1 | 11/2003 | Toriumi et al. | |
| 6,647,548 | B1 | 11/2003 | Lu et al. | |
| 6,675,383 | B1 | 1/2004 | Wheeler et al. | |
| 6,681,396 | B1 | 1/2004 | Bates et al. | |
| 6,791,472 | B1 | 9/2004 | Hoffberg | |
| 6,934,508 | B2 | 8/2005 | Ceresoli et al. | |
| 7,051,352 | B1 | 5/2006 | Schaffer | |
| 7,100,181 | B2 | 8/2006 | Srinivasan et al. | |
| 7,150,030 | B1 | 12/2006 | Eldering et al. | |
| 2002/0012353 | A1 | 1/2002 | Gerszberg et al. | |
| 2002/0015112 | A1* | 2/2002 | Nagakubo et al. | 348/734 |
| 2002/0026635 | A1 | 2/2002 | Wheeler et al. | |
| 2002/0056087 | A1 | 5/2002 | Berezowski et al. | |
| 2002/0057893 | A1 | 5/2002 | Wood et al. | |
| 2002/0059577 | A1 | 5/2002 | Lu et al. | |
| 2002/0072952 | A1 | 6/2002 | Hamzy et al. | |
| 2002/0077880 | A1 | 6/2002 | Gordon et al. | |
| 2002/0080286 | A1 | 6/2002 | Dagtas et al. | |
| 2002/0083435 | A1 | 6/2002 | Blasko | |
| 2002/0141730 | A1 | 10/2002 | Haken | |
| 2002/0174425 | A1 | 11/2002 | Markel et al. | |
| 2002/0198762 | A1 | 12/2002 | Donato | |
| 2003/0046685 | A1 | 3/2003 | Srinivasan et al. | |
| 2003/0054757 | A1 | 3/2003 | Kolessar et al. | |
| 2003/0056215 | A1* | 3/2003 | Kanungo | 725/38 |
| 2003/0067459 | A1* | 4/2003 | Lim | 345/207 |
| 2003/0093790 | A1 | 5/2003 | Logan et al. | |
| 2003/0101449 | A1 | 5/2003 | Bentolila et al. | |
| 2003/0110485 | A1 | 6/2003 | Lu et al. | |
| 2003/0115591 | A1 | 6/2003 | Weissmueller, Jr. et al. | |
| 2003/0131350 | A1 | 7/2003 | Peiffer et al. | |
| 2003/0216120 | A1 | 11/2003 | Ceresoli et al. | |
| 2004/0003394 | A1 | 1/2004 | Ramaswamy | |
| 2004/0055020 | A1 | 3/2004 | Delpuch | |
| 2004/0058675 | A1 | 3/2004 | Lu et al. | |
| 2004/0073918 | A1 | 4/2004 | Ferman et al. | |
| 2004/0088212 | A1 | 5/2004 | Hill | |
| 2004/0088721 | A1 | 5/2004 | Wheeler et al. | |
| 2004/0100437 | A1* | 5/2004 | Hunter et al. | 345/102 |
| 2004/0210922 | A1 | 10/2004 | Peiffer et al. | |
| 2005/0054285 | A1 | 3/2005 | Mears et al. | |
| 2005/0057550 | A1* | 3/2005 | George | 345/207 |
| 2005/0125820 | A1 | 6/2005 | Nelson et al. | |
| 2005/0221774 | A1 | 10/2005 | Ceresoli et al. | |
| 2005/0286860 | A1 | 12/2005 | Conklin | |
| 2006/0075421 | A1 | 4/2006 | Roberts et al. | |
| 2006/0093998 | A1 | 5/2006 | Vertegaal | |
| 2006/0195857 | A1 | 8/2006 | Wheeler et al. | |
| 2006/0212895 | A1 | 9/2006 | Johnson | |
| 2006/0232575 | A1 | 10/2006 | Nielsen | |
| 2007/0063850 | A1 | 3/2007 | Devaul et al. | |
| 2007/0186228 | A1 | 8/2007 | Ramaswamy et al. | |
| 2007/0192782 | A1 | 8/2007 | Ramaswamy | |
| 2008/0028427 | A1 | 1/2008 | Nesvadba et al. | |
| 2008/0148307 | A1 | 6/2008 | Nielsen et al. | |
| 2008/0276265 | A1 | 11/2008 | Topchy et al. | |

FOREIGN PATENT DOCUMENTS

| | | |
|---|---|---|
| EP | 0593202 | 4/1994 |
| EP | 0946012 | 9/1999 |
| EP | 1318679 | 6/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 95/26106 | 9/1995 |
| WO | 9810539 | 3/1998 |

| | | |
|---|---|---|
| WO | 99/33206 | 7/1999 |
| WO | 9959275 | 11/1999 |
| WO | WO 00/38360 | 6/2000 |
| WO | 00/72484 | 11/2000 |
| WO | 0111506 | 2/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03/060630 | 7/2003 |
| WO | 2005032145 | 4/2005 |
| WO | 2005038625 | 4/2005 |
| WO | 2005041166 | 5/2005 |
| WO | WO 2005/055601 | 6/2005 |
| WO | 2005065159 | 7/2005 |
| WO | 2005079457 | 9/2005 |
| WO | 2006012629 | 2/2006 |
| WO | 2007120518 | 10/2007 |

OTHER PUBLICATIONS

International Preliminary Report on Patentability corresponding to International Application Serial No. PCT/US2003/03070, Mar. 7, 2005, 4 pages.

International Search Report corresponding to International Patent Application Serial No. PCT/US2003/03070, Mar. 11, 2004, 7 pages.

Written Opinion corresponding to International Application Serial No. PCT/US2003/03070, Nov. 15, 2004, 5 pages.

Johnson, Karin A. "Methods and Apparatus to Detect an Operating State of a Display," U.S. Appl. No. 11/388,262, filed Mar. 24, 2006.

International Preliminary Examining Authority, "Written Opinion" for PCT Application Serial No. PCT/US2003/030355 mailed Mar. 21, 2008 (5 pages).

Thomas, William L., "Television Audience Research Technology, Today's Systems and Tomorrow's Challenges," Nielsen Media Research, Jun. 5, 1992 (4 pages).

Vincent et al., "A Tentative Typology of Audio Source Separation Tasks," 4th International Symposium on Independent Component Analysis and Blind Signal Separation (ICA 2003), held in Nara, Japan, Apr. 2003 (6 pages).

Smith, Leslie S., "Using IIDs to Estimate Sound Source Direction," Proceedings of the Seventh International Conference on Simulation of Adaptive Behavior on from Animals to Animals, pp. 60-61, 2002 (2 pages).

Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).

Elkan, Charles, "Naive Bayesian Learning," Adapted from Technical Report No. CS97-557, Department of Computer Science and Engineering, University of California, San Diego, U.S.A., Sep. 1997 (4 pages).

Zhang, Harry, "The Optimality of Naive Bayes," Proceedings of the Seventeenth International FLAIRS Conference, 2004 (6 pages).

Domingos et al., "On the Optimality of the Simple Bayesian Classifier under Zero-One Loss," Machine Learning, vol. 29, No. 2, pp. 103-130, Nov. 1, 1997 (28 pages).

Patron-Perez et al., "A Probabilistic Framework for Recognizing Similar Actions using Spatio-Temporal Features," BMVC07, 2007 [Retrieved from the Internet on Feb. 29, 2008] (10 pages).

Mitchell, Tom M., "Chapter 1; Generative and Discriminative Classifiers: Naive Bayes and Logistic Regression," Machine Learning, Sep. 21, 2006 (17 pages).

Lang, Marcus, "Implementation on Naive Bayesian Classifiers in Java," http://www.iit.edu/~ipro356f03/ipro/documents/naive-bayes.edu [Retrieved from the Internet on Feb. 29, 2008] (4 pages).

Liang et al., "Learning Naive Bayes Tree for Conditional Probability Estimation," Proceedings of the Canadian A1-2006 Conference, held in Quebec, Canada, pp. 456-466, on Jun. 7-9, 2006 (13 pages).

Mozina et al., "Nomograms for Visualization of Naive Bayesian Classifier," Proceedings of the Eight European Conference on Principles and Practice of Knowledge Discovery in Databases, held in Pisa, Italy, pp. 337-348, 2004 [Retrieved from the Internet on Feb. 29, 2008] (12 pages).

"Lecture 3; Naive Bayes Classification," http://www.cs.utoronto.ca/~strider/CSCD11_f08/NaiveBayes_Zemel.pdf [Retrieved from the Internet on Feb. 29, 2008] (9 pages).

Klein, Dan, PowerPoint Presentation of "Lecture 23: Naïve Bayes," CS 188: Artificial Intelligence held on Nov. 15, 2007 (6 pages).

"Learning Bayesian Networks: Naïve and non-Naïve Bayes" Oregon State University, Oregon [Retrieved from the Internet on Feb. 29, 2008]. Retrieved from the Internet: http://web.engr.oregonstate.edu/~tgd/classess/534/slides/part6.pdf (18 pages).

"The Naïve Bayes Classifier," CS534-Machine Learning, Oregon State University, Oregon [Retrieved from the Internet on Feb. 29, 2008]. Retrieved from the Internet: http://web.engr.oregonstate.edu/~afern/classes/cs534/notes/Naivebayes-10.pdf (19 pages).

"Bayesian Networks," Machine Learning A, 708.064 07 1sst KU Oregon State University, Oregon [Retrieved from the Internet on Feb. 29, 2008]. Retrieved from the Internet: http://www.igi.tugraz.at.lehre/MLA/WS07/slides3.pdf (21 pages).

"The Peltarion Blog," Jul. 10, 2006 [Retrieved from the Internet on Mar. 11, 2009] Retrieved from the Internet: http//blog.peltarion.com/2006/07/10/classifier-showdown (14 pages).

"Logical Connective: Philosophy 103: Introduction to Logic Conjunction, Negation, and Disjunction," [Retrieved from the Internet on 200-03-11] Retrieved from the Internet: http://philosophy.lander.edu/logic/conjunct.html (5 pages).

"Naïve Bayes Classifier," Wikipedia entry as of Mar. 11, 2009 [Retrieved from the Internet on Mar. 11, 2009] (7 pages).

"Naive Bayes Classifier," Wikipedia entry as of Jan. 11, 2008 [Retrieved from the Internet from Wikipedia history pages on Mar. 11, 2009] (7 pages).

Zimmerman, H., "Fuzzy set applications in pattern recognition and data-analysis," 11th IAPR International conference on Pattern Recognition, Aug. 29, 1992 (81 pages).

European Patent Office, "Extended European Search Report," issued in connection with European Patent Application No. EP05798239.9, on Sep. 9, 2008 (4 pages).

Patent Cooperation Treaty, "International Preliminary Report on Patentability," issued by the International Bureau in connection with PCT application No. PCT/US2005/028106, mailed Apr. 5, 2007 (5 pages).

Patent Cooperation Treaty, "International Search Report," issued by the International Searching Authority in connection with PCT application No. PCT/US2005/028106, mailed Mar. 12, 2007 (2 pages).

Patent Cooperation Treaty, "Written Opinion of the International Searching Authority," issued by the International Searching Authority in connection with PCT application No. PCT/US2005/028106, mailed Mar. 12, 2007 (4 pages).

Patent Cooperation Treaty, "International Search Report," issued by the International Searching Authority in connection with PCT application No. PCT/US2006/031960, mailed Feb. 21, 2007 (2 pages).

Patent Cooperation Treaty, "Written Opinion of the International Searching Authority," issued by the International Searching Authority in connection with PCT application No. PCT/US2006/031960, mailed Feb. 21, 2007 (3 pages).

Patent Cooperation Treaty, "International Preliminary Report on Patentability," issued by the International Bureau in connection with PCT application No. PCT/US2006/031960, mailed Feb. 20, 2008 (4 pages).

Non-Final Office Action issued by the United States Patent and Trademark Office on Feb. 5, 2009, in connection with U.S. Appl. No. 11/576,328 (20 pages).

Non-Final Office Action issued by the United States Patent and Trademark Office on Mar. 5, 2009, in connection with U.S. Appl. No. 11/388,262 (22 pages).

* cited by examiner

700

METHODS AND APPARATUS TO DETECT AN OPERATING STATE OF A DISPLAY BASED ON VISIBLE LIGHT

RELATED APPLICATION

This patent arises from a continuation of PCT Application Serial No. PCT/US2003/030370, filed Sep. 25, 2003, which is incorporated herein by reference.

TECHNICAL FIELD

The present disclosure relates generally to audience measurement, and more particularly, to methods and apparatus to detect an operating state of a display based on visible light.

BACKGROUND

Determining the size and demographics of a television viewing audience helps television program producers improve their television programming and determine a price to be charged for advertising that is broadcasted during such programming In addition, accurate television viewing demographics allows advertisers to target audiences of a desired size and/or audiences comprised of members having a set of common, desired characteristics (e.g., income level, lifestyles, interests, etc.).

In order to collect these demographics, an audience measurement company may enlist a number of television viewers to cooperate in an audience measurement study for a predefined length of time. The viewing habits of these enlisted viewers, as well as demographic data about these enlisted viewers, are collected using automated and/or manual collection methods. The collected data is subsequently used to generate a variety of informational statistics related to television viewing audiences including, for example, audience sizes, audience demographics, audience preferences, the total number of hours of television viewing per household and/or per region, etc. monitored. For example, homes that receive cable television signals and/or satellite television signals typically include a set top box (STB) to receive television signals from a cable and/or satellite television provider. Television systems configured in this manner are typically monitored using hardware, firmware, and/or software to interface with the STB to extract or to generate signal information therefrom. Such hardware, firmware, and/or software may be adapted to perform a variety of monitoring tasks including, for example, detecting the channel tuning status of a tuning device disposed in the STB, extracting program identification codes embedded in television signals received at the STB, generating signatures characteristic of television signals received at the STB, etc. However, many television systems that include an STB are configured such that the STB may be powered independent of the television set. As a result, the STB may be turned on (i.e., powered up) and continue to supply television signals to the television set even when the television set is turned off. Thus, monitoring of television systems having independently powered devices typically involves an additional device or method to determine the operational status of the television set to ensure that the collected data reflects information about television signals that were merely supplied to the television set, which may or may not be turned on. Although there are a variety of techniques to determine the operational status of the television set, many of these techniques are invasive to the television set and increases unnecessary risk in damaging the television set during installation of the circuitry to determine the operational status. Further some of these techniques involve monitoring the consumption of power by the television set. Unfortunately, the consumption of power by the television set does not necessarily indicate that the television screen is operational. Other techniques to determine the operational status of the television set are complex and tend to be costly to implement.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure discusses example television systems, it should be understood that the disclosed system is readily applicable to many other media systems. Accordingly, while the following describes example systems and processes, persons of ordinary skill in the art will readily appreciate that the disclosed examples are not the only way to implement such systems.

Figure 1:
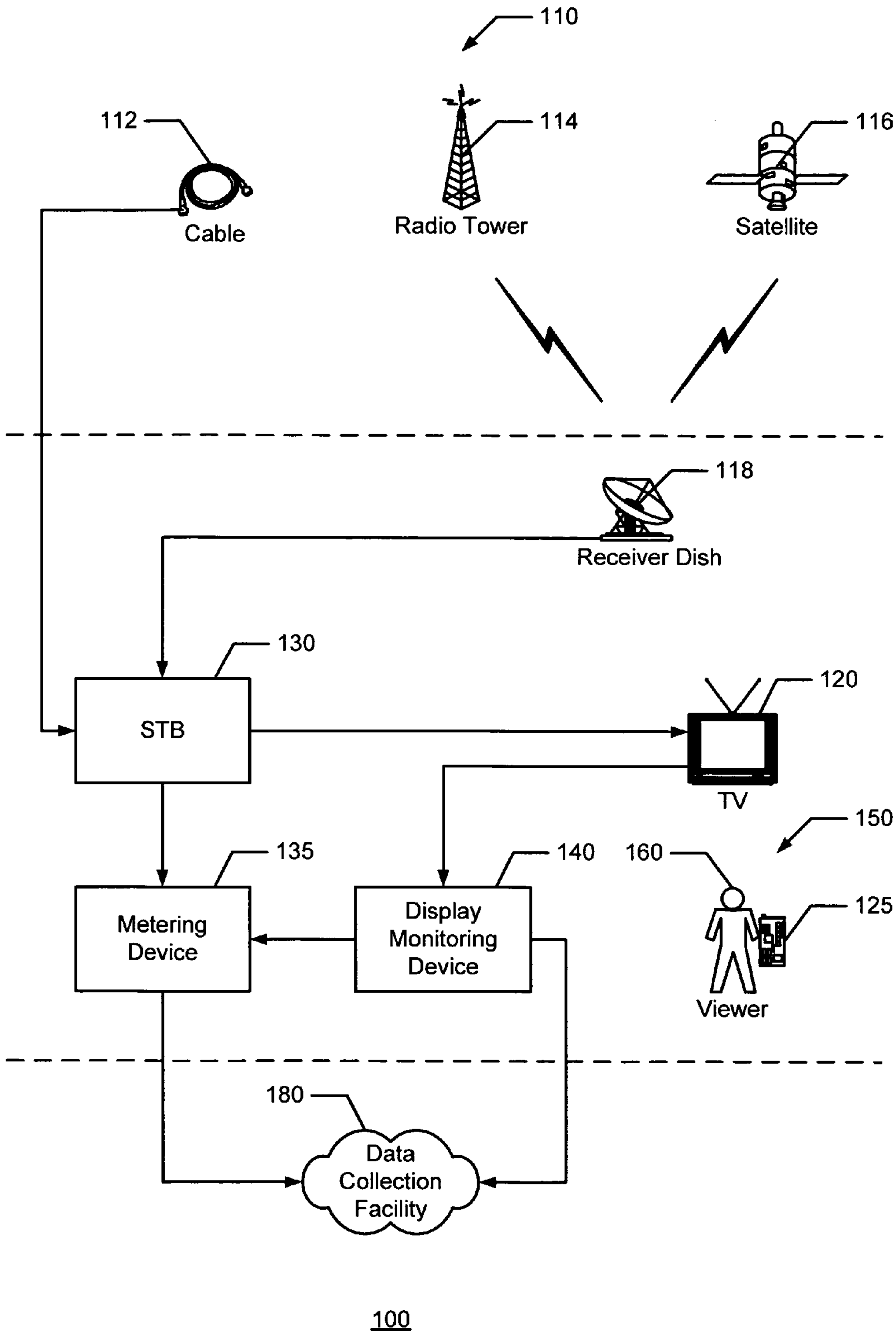
FIG. 1 is a block diagram representation of an example broadcast system.

In the example of FIG. 1, an example broadcast system 100 including a service provider 110, a television 120, a remote control device 125, and a set top box (STB) 130 is metered using an audience measurement system. The components of the system 100 may be coupled in any well known manner. In the illustrated example, the television 120 (e.g., a cathode ray tube (CRT) television, a liquid crystal display (LCD) television, a plasma television, etc.) is positioned in a viewing area 150 located within a house occupied by one or more people, referred to as household members 160. The viewing area 150 includes the area in which the television 120 is located and from which the television 120 may be viewed by one or more household members 160 located in the viewing area 150. In the illustrated example, a metering device 135 is configured to monitor the STB 130 and to collect viewing data to determine the viewing habits of the household members 160. The television 120 and the STB 130 may be powered independently such that the STB 130 may be configured to remain turned on at all times while the television 120 may be turned on or off depending on whether one or more of the household members 160 decides to watch television. Accordingly, the broadcast system 100 may also include a display monitoring device 140 configured to detect an operating state of the television 120 (i.e., on or off) and to generate data indicative of the operating state. The generated data of the operating state may then be used, for example, to supplement the data collected by the metering device 135 and/or to control the collection of data by the metering device 135. For example, television operating state data may be used to determine whether data collected by the metering device 135 corresponds to television signals that were not only supplied to the television 120 but to television signals that were actually displayed by the television 120. In another example, the television operating state data generated by the display monitoring device 140 may be used to control the operation of the metering device 135. In particular, the display monitoring device 140 may generate a control signal that causes the metering device 135 to begin collecting metering data in response to detecting that the television 120 is turned on. The display monitoring device 140 may also generate a control signal that causes the metering device 135 to stop collecting metering data in response to detecting that the television 120 is turned off. Thus, the display monitoring device 140 optimizes the amount of data collected by the metering device 135, which in turn, allows for a reduction in the amount of memory required to store metering data. Such reduction in memory may be substantial especially for systems that employ metering devices configured to generate data intensive signatures characterizing the television content.

The display monitoring device 140 may also be configured to determine the total number of hours of television watched by the household members 160. As described in detail below, the display monitoring device 140 may generate time stamps corresponding to the times at which the television 120 is turned on (i.e., begins to display content) and/or the times at which the television 120 is turned off (i.e., stops displaying content). Alternatively, the display monitoring device 140 may be configured to provide the television operating state data to the metering device 135, which in turn, generates time stamps associated with the data so that the total number of hours of television watched may be calculated therefrom. Further, the display monitoring device 140 may provide the television operating state data to the central data collection facility 180 either directly or via the metering device 135. If the display monitoring device 140 directly provides the television operating state data to the data collection facility 180 then the display monitoring device 140 may include a communication device (one shown as 280 in FIG. 2) such as a wired or wireless telephone communication circuit, a cable modem, etc. The data collection facility 180 is configured to process and/or store data received from the display monitoring device 140 and/or the metering device to produce television viewing information.

The service provider 110 may be implemented by any service provider such as, for example, a cable television service provider 112, a radio frequency (RF) television service provider 114, and/or a satellite television service provider 116. The television 120 receives a plurality of television signals transmitted via a plurality of channels by the service provider 110 and may be adapted to process and display television signals provided in any format such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc.

The user-operated remote control device 125 allows a user to cause the television 120 to tune to and receive signals transmitted on a desired channel, and to cause the television 120 to process and present the programming content contained in the signals transmitted on the desired channel. The processing performed by the television 120 may include, for example, extracting a video and/or an audio component delivered via the received signal, causing the video component to be displayed on a screen/display associated with the television 120, and causing the audio component to be emitted by speakers associated with the television 120. The programming content contained in the television signal may include, for example, a television program, a movie, an advertisement, a video game, and/or a preview of other programming content that is currently offered or will be offered in the future by the service provider 110.

While the components shown in FIG. 1 are depicted as separate structures within the television system 100, the functions performed by some of these structures may be integrated within a single unit or may be implemented using two or more separate components. For example, although the television 120, the STB 130, and the metering device 135 are depicted as separate structures, persons of ordinary skill in the art will readily appreciate that the television 120, the STB 130, and/or the metering device 135 may be integrated into a single unit. In another example, the STB 130, the metering device 135, and/or the display monitoring device 140 may also be integrated into a single unit. In fact, the television 120, the STB 130, the metering device 135, and the display monitoring device 140 may be integrated into a single unit as well.

Figure 2:
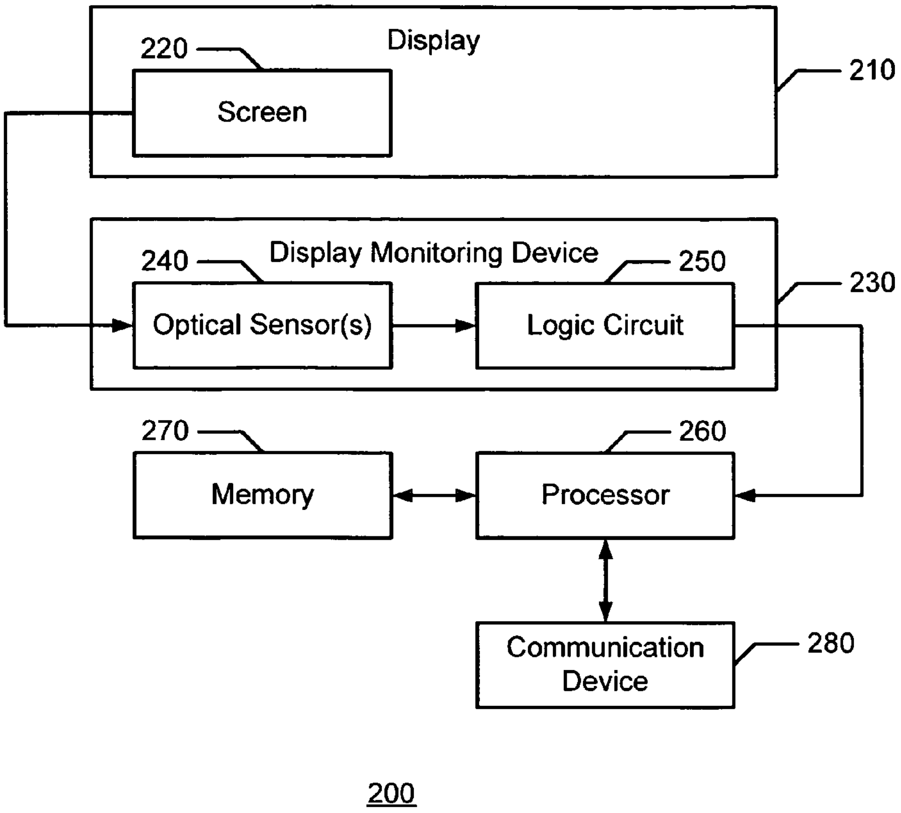
FIG. 2 is a block diagram representation of an example display monitoring system.

In the example of FIG. 2, the illustrated display monitoring system 200 includes a display 210 (e.g., a television, a monitor, and/or other media output device) and a display monitoring device 230. The display 210 may be implemented by any desired type of display such as a liquid crystal (LCD), a plasma display, and a cathode ray tube (CRT) display. The display 210 includes a screen 220 that projects images by emitting light energy when power is applied to the display 210 (i.e., the display 210 is turned on). The screen 220 is turned off (i.e., blank) when no power is applied to the display 210 or when the display 210 enters a standby state, a sleep state, and/or a power save state (i.e., power is applied to the display 210 but the screen 220 is blank).

The display monitoring device 230 is optically coupled to the screen 220 of the display 210. In particular, the display monitoring device 230 includes an optical sensor 240, and a logic circuit 250. As described in detail below, the optical sensor 240 is disposed relative to the screen 220 of the display 210 to detect visible light emanating from the screen and to convert the visible light into an electrical signal. For example, the optical sensor 240 may be a photodetector (e.g., phototransistors, photoresistors, photocapacitors, photovoltaics such as solar cells, and/or a photodiode) and/or any suitable light-sensitive semiconductor junction device configured to convert light energy emitted by the screen 220 into an electrical signal. Alternatively, the optical sensor 240 may be implemented by using a camera or a transparent waveguide to relay the light energy from the screen 220 to the optical sensor 240. Persons of ordinary skill in the art will readily appreciate that the visible light captured by the optical sensor 240 may be analyzed by signal processing and/or pattern matching to determine information associated with the captured visible light such as raw light intensity (i.e., luminance) and/or color (i.e., chrominance). The electrical signal may be used to generate information to determine an operating state of the display 210 as described in detail below.

The electrical signal is provided to the logic circuit 250, which in turn, generates an output signal indicative of an operating state of the display 210 based on the electrical signal. In particular, the output signal indicates either an on state or an off state of the display 210. For example, the logic circuit 250 may generate a HIGH signal (i.e., a logic "1") to indicate that the display 210 is turned on (i.e., light energy to project images on the screen 220 is detected). In contrast, the logic circuit 250 may generate a LOW signal (i.e., a logic "0") to indicate that the display 210 is turned off (i.e., no light energy to project images on the screen 220 is detected).

A processor 260 may use the output signal indicative of the operating state of the display 210 to track when and how long the display 210 is turned on or off. For example, the processor 260 may generate a time stamp corresponding to the time when the processor 260 receives a HIGH signal as the output signal. The processor 260 may generate another time stamp when the processor 260 receives a LOW signal as the output signal. The processor 260 is operatively coupled to a memory 270 to store the on/off information. The memory 270 may be implemented by any type of memory such as a volatile memory (e.g., random access memory (RAM)), a nonvolatile memory (e.g., flash memory) or other mass storage device (e.g., a floppy disk, a CD, and a DVD). Based on the time stamps corresponding to the output signals from the logic circuit 250, the processor 260 may automatically provide operating information (e.g., when the display 210 was turned on or off) to the data collection facility 180 via a communication device 280 (e.g., a wired or wireless telephone communication circuit, a cable modem, etc.). As noted above, the data collection facility 180 is configured to produce television viewing data. For example, the data collection facility 180 may use the on/off information to determine a total number of hours that the household members 160 watch television.

While the components shown in FIG. 2 are depicted as separate structures within the display monitoring system 200, the functions performed by some of these structures may be integrated within a single unit or may be implemented using two or more separate components. For example, although the display monitoring device 230 and the processor 260 are depicted as separate structures, persons of ordinary skill in the art will readily appreciate that the display monitoring device 230 and the processor 260 may be integrated into a single unit. Further, the processor 260 may be configured to generate the output signal indicative of the operating state of the display 220 based on the electrical signal from the signal processing circuit 244 (i.e., the processor 260 may replace the logic circuit 250). The memory 270 may also be integrated into the display monitoring device 240.

Figure 3:
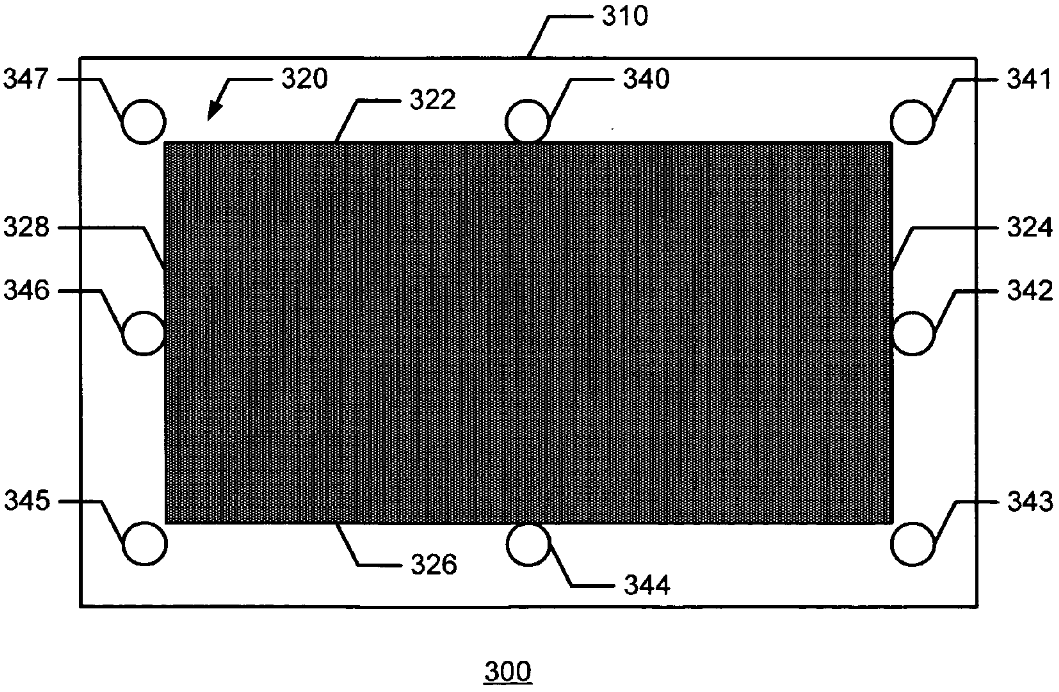
FIG. 3 is a schematic diagram representation of a portion of the example display monitoring system of FIG. 2.

As noted above, the optical sensor 240 is disposed relative to the screen 220 of the display 210 to detect visible light emanating from the screen 220 and to convert the visible light into an electrical signal. In the display monitoring system 300 illustrated in FIG. 3, an optical sensor 340 is disposed adjacent to an edge 322 of a screen 320. That is, the optical sensor 340 extends from the edge 322 to detect visible light emanating from the screen 320. To improve accuracy of the display monitoring device 230, one or more optical sensors (generally shown as 341, 342, 343, 344, 345, 346, and 347) may be disposed adjacent to the other edges (generally shown as 324, 326, and 328) of the screen 320. Thus, visible light emanating from any portion of the screen 320 may be monitored.

Figure 4:
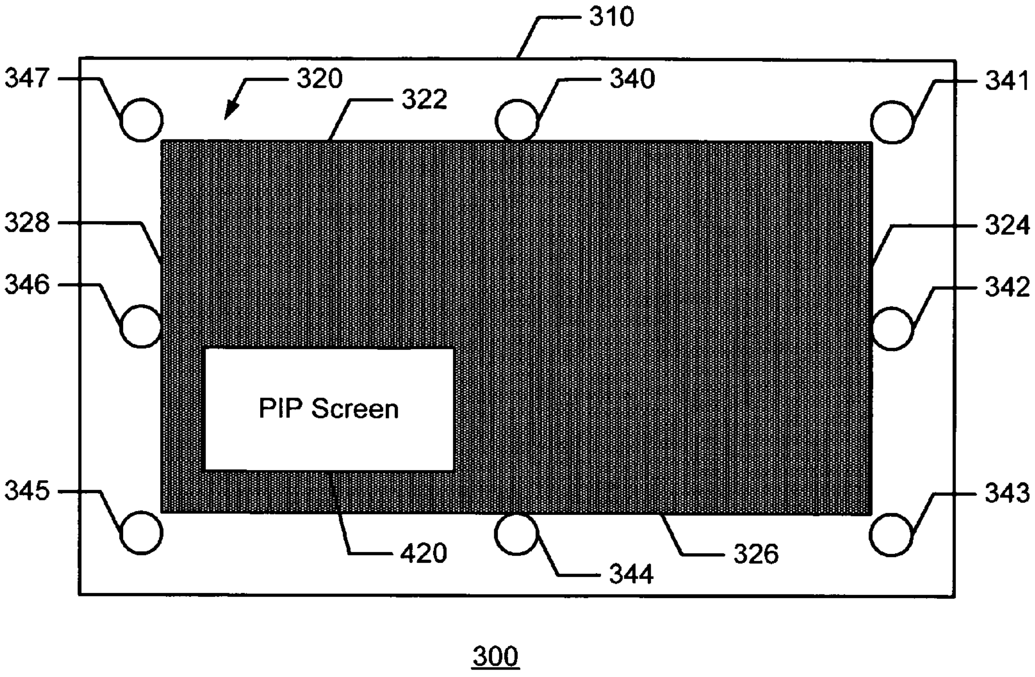
FIG. 4 is a schematic diagram representation of the example display monitoring system of FIG. 3 entered an on state.
Figure 5:
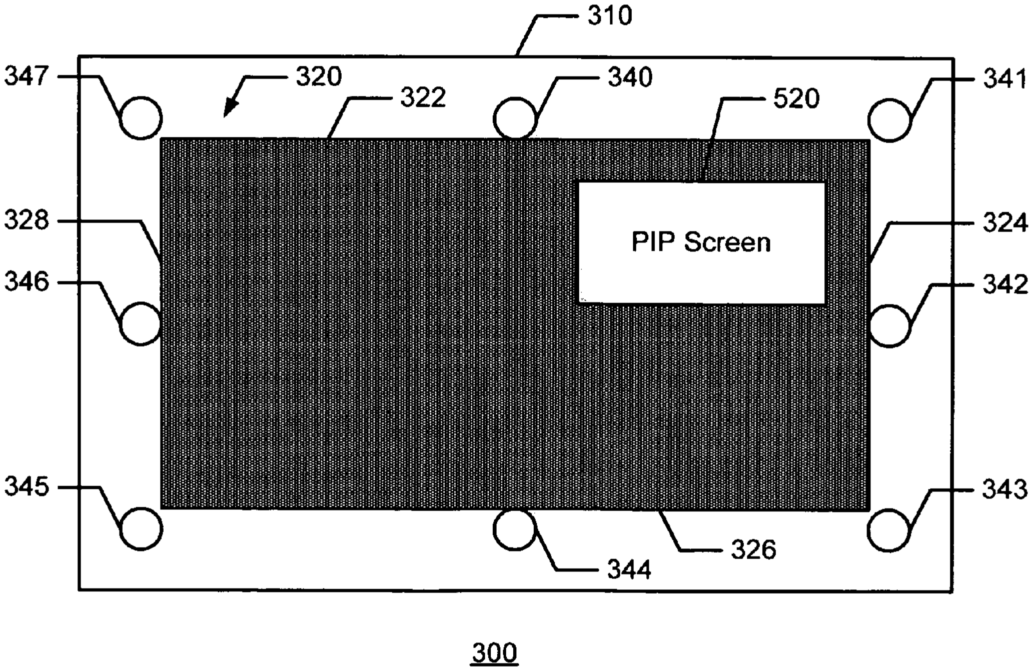
FIG. 5 is another schematic diagram representation of the example display monitoring system of FIG. 3 entered an on state.

Referring to FIG. 4, for example, the display 310 may be operating in a picture-in-picture (PIP) mode (i.e., a smaller screen 420 within the main screen 320). Persons of ordinary skill in the art will readily recognize that the main screen 320 may display programming content or other content via one video signal and/or source (e.g., a football game) while the PIP screen 420 may display programming content or other content provided via another video signal and/or source (e.g., same football game or another football game). In the illustrated example, the PIP screen 420 may emanate visible light to project images provided via a video signal whereas the main screen 320 may be blank. That is, the main screen 320 is not receiving a video signal to be displayed and therefore, is not emanating visible light. Even though optical sensors 340, 341, 342, 343, and/or 347 may not detect visible light because the main screen 320 is blank, optical sensors 344, 345, and/or 346 may detect visible light emanating from the PIP screen 420 that is then converted into an electrical signal. In another example shown in FIG. 5, optical sensors 343, 344, 345, 346, and/or 347 may not detect visible light whereas optical sensors 340, 341, and/or 342 may detect visible light emanating from the PIP screen 520 that is then converted into an electrical signal. Accordingly, the display monitoring device 230 is capable of detecting that the display 310 is turned on even if only a portion of the entire screen (i.e., the PIP screens 420, 520) is displaying programming content or other content.

Figure 6:
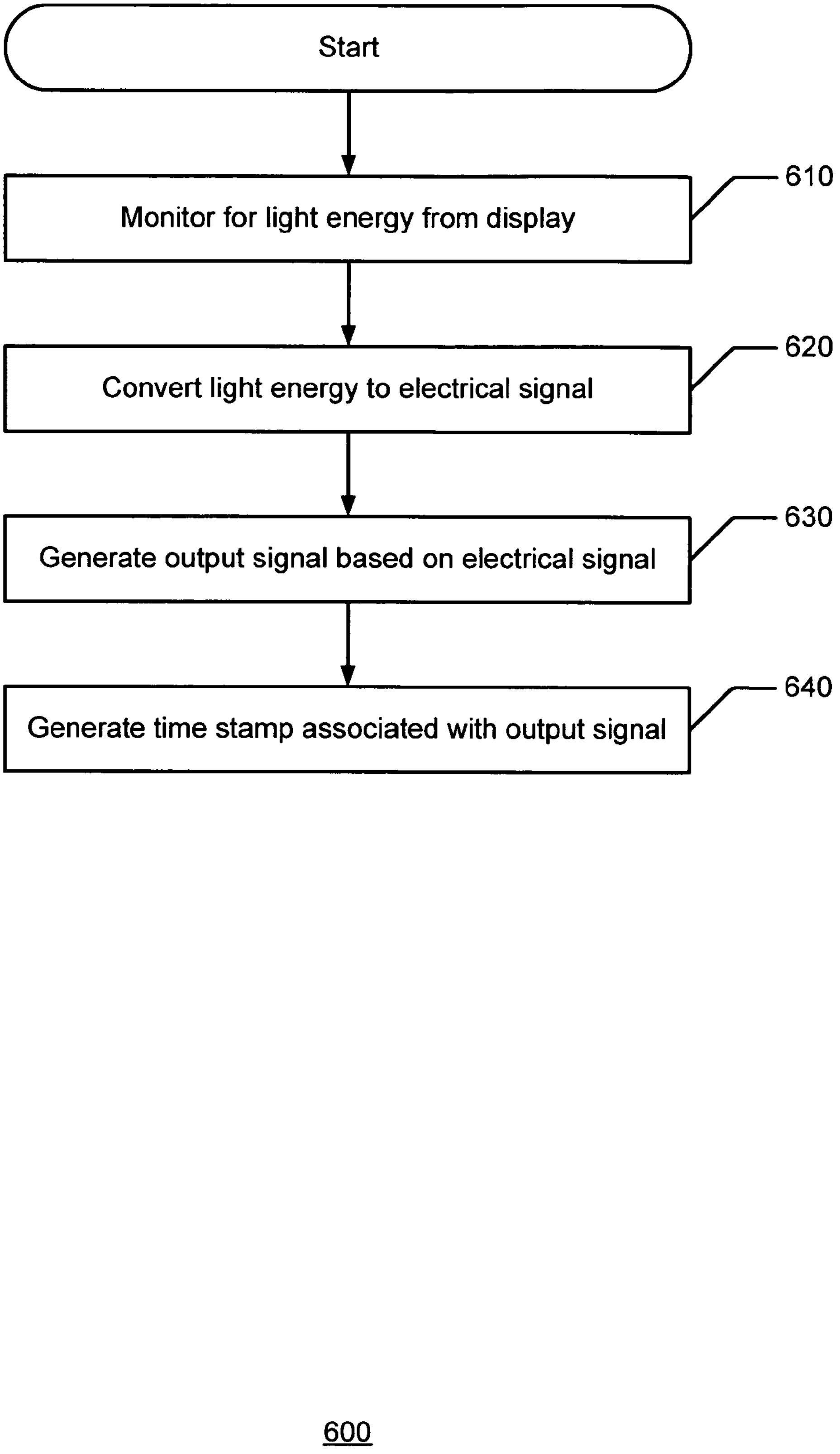
FIG. 6 is a flow diagram representation to detect an operating state of a display based on visible light.

An example method which may be executed to detect an operating state of a display based on visible light is illustrated in FIG. 6. Persons of ordinary skill in the art will appreciate that the method can be implemented in many different ways. Further, although a particular order of actions is illustrated in FIG. 6, persons of ordinary skill in the art will appreciate that these actions can be performed in other temporal sequences. The flow chart 600 is merely provided as an example of one way to use the display monitoring device 230 to detect an operating state of the display 210 based on visible light.

In the example of FIG. 6, the display monitoring device 230 monitors for the presence of light energy emanating from the screen 220 of the display 210 (block 610). In particular, the optical sensor 240 is disposed relative to the screen 220 to detect visible light emanating from the screen 220. For example, the optical sensor 240 is disposed adjacent to an edge of the screen 220. In response to detecting visible light emanating from the screen 220, the optical sensor 240 converts light energy from the screen 220 to an electrical signal (block 620). Based on the electrical signal the display monitoring device 230 generates an output signal indicative of an operating state of the display (block 630). In particular, the output signal is indicative of whether the display 210 is in an on state or an off state. For example, the logic circuit 250 may generate a HIGH signal (i.e., a logic "1") to indicate that the display 210 is turned on. Alternatively, the logic circuit 250 may generate a LOW signal (i.e., a logic "0") to indicate that the display 210 is turned off or in standby state and/or a power save state when the screen 220 is blank.

Whenever there is a change in the state of the output signal from the logic circuit 250, the processor 260 may generate a time stamp (block 640). For example, when the processor 260 first detects a HIGH signal from the logic circuit 250, the processor 260 generates a time stamp and stores data indicating that the display 210 entered an on state at the time indicated by the time stamp. When the processor 260 detects a LOW signal from the logic circuit 250, it generates a time stamp and stores data indicating that the display 210 entered an off state at the time indicated by the time stamp. This operating information (e.g., when the display 210 was turned on or off) may be provided to the data collection facility 180 and/or provided to the metering device 135 that subsequently transmits the operating information to the data collection facility 180. The operating information may be used to produce television audience statistics. As noted above, the operating information may be used to determine a number of hours of that the household members 160 watch television. Further, as noted above, the operating information may also be used to reduce and/or to filter out data that is collected by the metering device 135. The data collection facility 180 may also use the operating information to separate the viewing data corresponding to programming content that were actually displayed from the viewing data corresponding to programming content that were merely provided to the television 120 when the television 120 was turned off.

Figure 7:
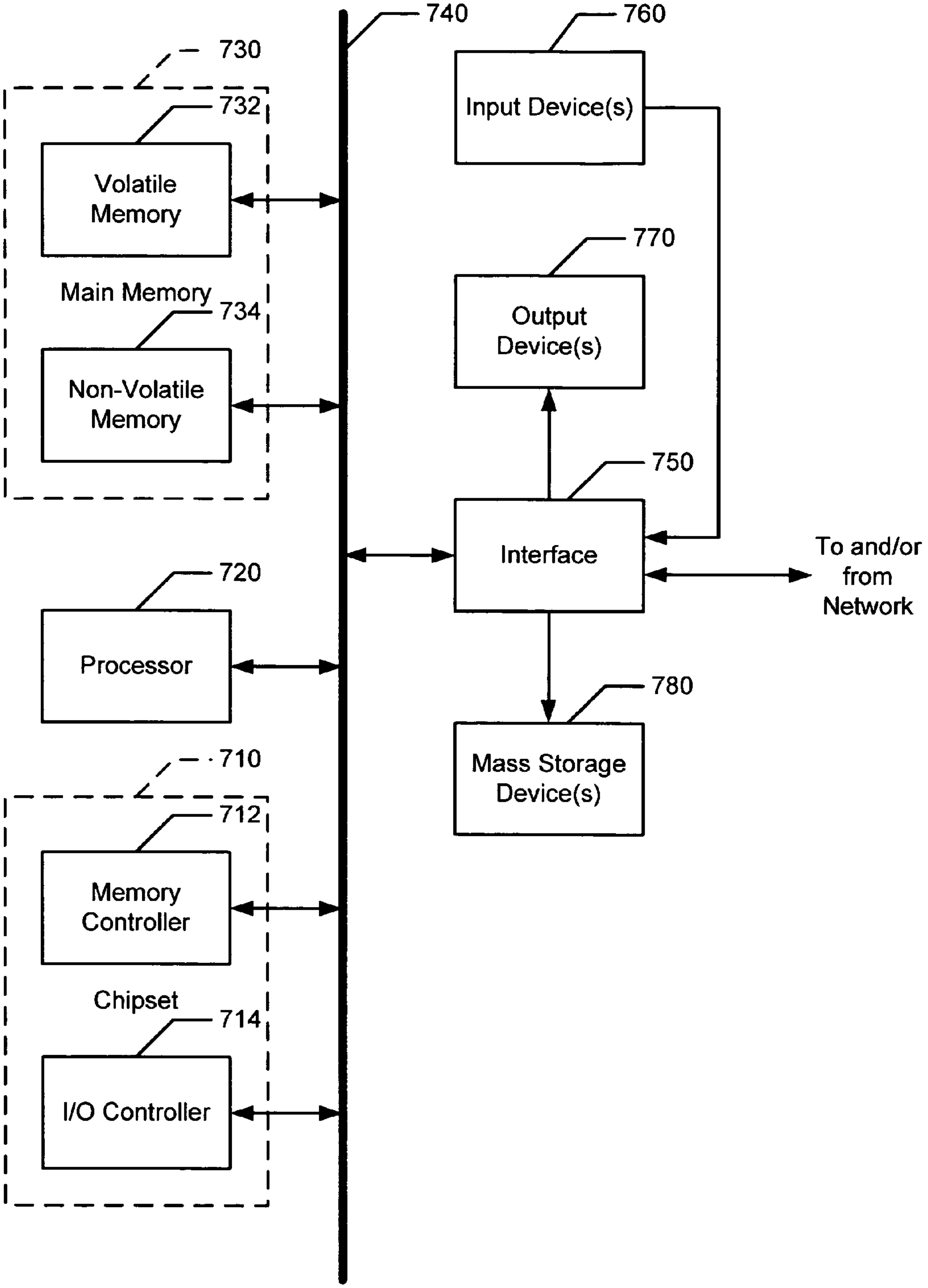
FIG. 7 is a block diagram representation of an example processor system configured to detect an operating state of a display based on visible light.

FIG. 7 is a block diagram of an example processor system 700 adapted to implement the methods and apparatus disclosed herein. The processor system 700 may be a desktop computer, a laptop computer, a notebook computer, a personal digital assistant (PDA), a server, an Internet appliance or any other type of computing device.

The processor system 700 illustrated in FIG. 7 includes a chipset 710, which includes a memory controller 712 and an input/output (I/O) controller 714. As is well known, a chipset typically provides memory and I/O management functions, as well as a plurality of general purpose and/or special purpose registers, timers, etc. that are accessible or used by a processor 720, which may be implemented by the processor 260 shown in FIG. 2. The processor 720 is implemented using one or more processors.

As is conventional, the memory controller 712 performs functions that enable the processor 720 to access and communicate with a main memory 730 including a volatile memory 732 and a non-volatile memory 734 via a bus 740. For example, the main memory 730 may be implemented by the memory 270 shown in FIG. 2. The volatile memory 732 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 may be implemented using flash memory, Read Only Memory (ROM), Electrically Erasable Programmable Read Only Memory (EEPROM), and/or any other desired type of memory device.

The processor system 700 also includes an interface circuit 750 that is coupled to the bus 740. The interface circuit 750 may be implemented using any type of well known interface standard such as an Ethernet interface, a universal serial bus (USB), a third generation input/output interface (3GIO) interface, and/or any other suitable type of interface.

One or more input devices 760 are connected to the interface circuit 750. The input device(s) 760 permit a user to enter data and commands into the processor 720. For example, the input device(s) 760 may be implemented by a keyboard, a mouse, a touch-sensitive display, a track pad, a track ball, an isopoint, and/or a voice recognition system.

One or more output devices 770 are also connected to the interface circuit 750. For example, the output device(s) 770 may be implemented by display devices (e.g., a light emitting display (LED), a liquid crystal display (LCD), a cathode ray tube (CRT) display, a printer and/or speakers). The interface circuit 750, thus, typically includes, among other things, a graphics driver card.

The processor system 700 also includes one or more mass storage devices 780 configured to store software and data. Examples of such mass storage device(s) 780 include floppy disks and drives, hard disk drives, compact disks and drives, and digital versatile disks (DVD) and drives.

The interface circuit 750 also includes a communication device such as a modem or a network interface card to facilitate exchange of data with external computers via a network. The communication link between the processor system 700 and the network may be any type of network connection such as an Ethernet connection, a digital subscriber line (DSL), a telephone line, a cellular telephone system, a coaxial cable, etc.

Access to the input device(s) 760, the output device(s) 770, the mass storage device(s) 780 and/or the network is typically controlled by the I/O controller 714 in a conventional manner. In particular, the I/O controller 714 performs functions that enable the processor 720 to communicate with the input device(s) 760, the output device(s) 770, the mass storage device(s) 780 and/or the network via the bus 740 and the interface circuit 750.

While the components shown in FIG. 7 are depicted as separate blocks within the processor system 700, the functions performed by some of these blocks may be integrated within a single semiconductor circuit or may be implemented using two or more separate integrated circuits. For example, although the memory controller 712 and the I/O controller 714 are depicted as separate blocks within the chipset 710, persons of ordinary skill in the art will readily appreciate that the memory controller 712 and the I/O controller 714 may be integrated within a single semiconductor circuit.

Machine readable instructions may be executed by the processor system 700 (e.g., via the processor 720) illustrated in FIG. 7 to detect an operating state of the display 210. Persons of ordinary skill in the art will appreciate that the instructions can be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

While the methods and apparatus disclosed herein are particularly well suited for use with a television, the teachings of the disclosure may be applied to detect an operating state of other types of display. For example, the methods and apparatus disclosed herein may detect an operating state of a computer monitor, a projector screen, and/or other media output device. Thus, the methods and apparatus disclosed herein may collect data associated with Internet usage and/or other display of media via a computer.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A device to detect an operating state of a display, the device comprising:

a plurality of optical sensors disposed to detect humanly visible light emanating from a screen of the display and to convert the humanly visible light into an electrical signal, the plurality of optical sensors to be distributed adjacent edges of the screen to enable detection of an on state of the display even if only a portion of the display emanates visible light; and a logic circuit coupled to the at least one optical sensor, the logic circuit being configured to generate an output signal indicative of the operating state of the display based on the electrical signal without affecting operation of the display, wherein the portion of the display emanating visible light is a picture-in-picture screen of the display and a main screen of the display does not emanate visible light.

2. A device to detect an operating state of a display, the device comprising:

at least one optical sensor disposed to detect humanly visible light emanating from a screen of the display and to convert the humanly visible light into an electrical signal, the at least one optical sensor distributed adjacent at least one edge of the screen to enable detection of an on state of the display even if only a portion of the display emanates visible light; and a logic circuit coupled to the at least one optical sensor, the logic circuit being configured to generate an output signal indicative of the operating state of the display based on the electrical signal, wherein the portion of the display emanating visible light is a picture-in-picture screen of the display and a main screen of the display does not emanate visible light.

3. The device as defined in claim 2, wherein the display is one of a cathode ray tube (CRT) display, a liquid crystal display (LCD), and a plasma display.

4. The device as defined in claim 2, wherein the at least one optical sensor comprises at least one photodetector.

5. The device as defined in claim 2, wherein the at least one optical sensor is disposed adjacent an edge of the screen.

6. The device as defined in claim 2 further comprising a processor coupled to the logic circuit, the processor being configured to associate a time stamp with the output signal from the logic circuit and to provide operating information associated with the display to a data collection facility.

7. The device as defined in claim 2, wherein the operating state of the display comprises at least one of an on state and an off state.

8. The device as defined in claim 2, wherein the device is integrated into a set top box (STB).

9. The device as defined in claim 2 further comprising a transparent waveguide coupled to the optical sensor, the transparent waveguide being configured to relay visible light emanating from the screen of the display to the optical sensor.

* * * * *